Aug. 21, 1928.
F. Z. MATHIEU
1,681,775
COOLING AND FILLING CAP FOR RADIATORS
Filed June 22, 1926
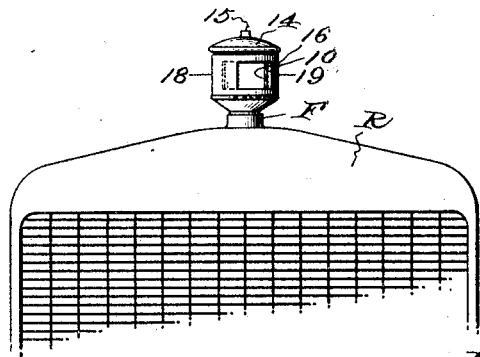
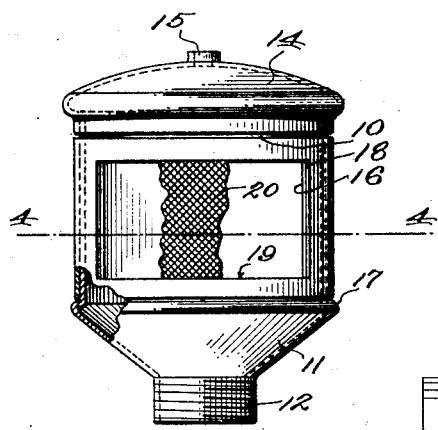
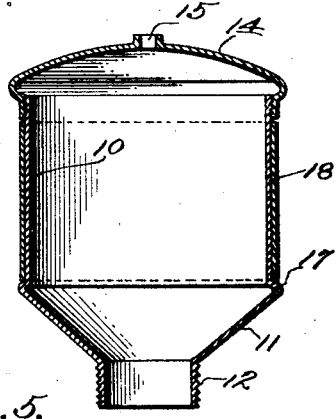
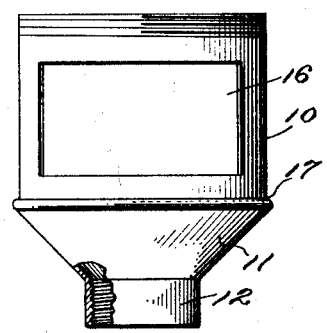
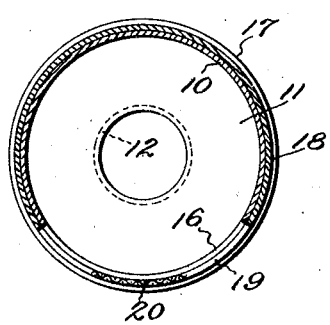
INVENTOR.
Frank Z. Mathieu
BY
Hubert E. Peck ATTORNEY.

Patented Aug. 21, 1928.

1,681,775

UNITED STATES PATENT OFFICE.

FRANK Z. MATHIEU, OF MIDLAND, MICHIGAN.

COOLING AND FILLING CAP FOR RADIATORS.

Application filed June 22, 1926. Serial No. 117,787.

This invention relates to certain improvements in cooling and filling caps for radiators; and the nature and objects of the invention will be readily recognized and understood by those skilled in the art in the light of the following explanation and detailed description of the accompanying drawings illustrating what I at present consider to be the preferred embodiment or mechanical expressions of the invention from among various other forms, arrangements, combinations and constructions of which the invention is capable within the spirit and scope thereof.

The invention is particularly directed to the provision of a cap or closure for the filling neck or opening of a motor vehicle radiator, and presents as one of its main objects and characteristics a design and construction of such a cap or closure by which the more rapid cooling of the water or other liquid in the radiator can be secured to prevent overheating of the motor cooled by such liquid, and to further provide for ready opening of the radiator filling neck to permit of replenishing or filling the radiator with cooling liquid.

A further object of the invention is to provide a cap or closure for the filling neck or opening of a motor vehicle radiator, which is formed with a variable opening or port therein through the medium of which the interior of the radiator can be opened to atmosphere during movement of a motor vehicle to cause flow of air into the radiator to assist in rapid cooling of the liquid therein.

Another object of the invention is to provide a filling cap or closure for a motor vehicle radiator with a port or opening through a side thereof, together with means for opening or closing the opening, or varying the area thereof opened, to assist in cooling the liquid in the radiator by discharge of air thereinto, as well as to provide such a device with a removable cover or head to permit of filling the radiator with liquid.

Another object of the invention is to provide a cooling and filling cap for motor vehicle radiators embodying the above mentioned characteristics, which cap is adapted for application to and use on and with all types of water or liquid cooling radiators for motor vehicles, and which is of simple design and construction capable of manufacture in quantities at relatively small cost, and positive and efficient in operation with a minimum of attention and upkeep required in use.

With the foregoing general objects, and certain other objects and results in view which will be readily recognized by those familiar with this art from the following explanation, the invention consists in certain novel features in construction and in combination and arrangement of parts, as will be more fully and completely referred to and specified hereinafter.

Referring to the accompanying drawings, in which similar reference characters refer to corresponding parts throughout the several figures thereof:

Fig. 1, is a view in front elevation of a portion of a motor vehicle radiator with a cooling and filling cap of the invention mounted in operative position on and in the filling neck or opening of the radiator.

Fig. 2, is a view in elevation of the cooling and filling cap of Fig. 1, in open, cooling position.

Fig. 3, is a transverse vertical section through the cap of Fig. 2.

Fig. 4, is a horizontal section through the cap taken on the line 4—4, of Fig. 2.

Fig. 5, is a view in elevation of the body or casing of the cap with the top and adjustable band or sleeve for opening and closing the air port or opening, removed.

One possible embodiment of which the invention is capable, is presented in the drawings purely by way of example and not of limitation to permit of explaining the principles and various features of the invention, but it is to be understood, as will be obvious from the following description, that the invention can be mechanically expressed in other forms and by other constructions, than the specific example here shown.

According to the invention, a casing or body 10 is provided which in the example hereof is tubular in form having an open top, and a downwardly tapering, funnel shaped lower or bottom wall 11, terminating in the depending, externally screw threaded discharge neck 12, of reduced diameter with respect to the body or casing 10. The open, upper end of the casing 10 is externally screw threaded, and is normally closed by the removable top or cover 14 threaded thereon. The top 14, in this instance, although not so limited, is provided with a central aperture 15 forming a socket for receiving the support for any suitable ornament such as a flag, which it may be desired to carry with the cap of the invention mounted on a radiator.

Through the side of casing 10 between the upper end thereof and the contracting bottom wall 11, a port or opening 16 is provided, which in the example here shown is of a width approximating the diameter or width of casing 10, so that the port is of substantial area and extends across one side of the casing. At the lower end of casing 10 at its junction with the bottom wall 11, a circumferential bead or shoulder 17 is formed around the exterior of the casing, and a sleeve or band 18 is fitted over and around the exterior of the casing 10 for rotation thereon and therearound. The band 18 is confined on the casing 10 against downward displacement by the shoulder or bead 17 on which it bears, and extends upwardly to the lower edge of the cover 14, being preferably spaced slightly therefrom. The width of band 18 is thus such that it covers the port or opening 16 through the casing 10, and the band forms a sufficiently tight fit with and on the casing that it will not readily rotate therearound from vibration, but can be manually or positively rotated on and around the casing to any desired position. The band 18 is provided with a port or opening 19 therethrough of the same size and area as opening 16 through the casing and by rotating band 18 can be positioned to register with casing port 16 and form an opening from atmosphere to the interior of the casing, or the band can be rotated to move port 19 from registry with port 16, with the body of the band over and closing the latter port, as will be clear.

In operation and use of the radiator cooling and filling cap constructed and arranged as above described, referring now to Fig. 1 of the accompanying drawings in particular, the cap is mounted on a motor vehicle radiator R by screwing the discharge neck 12 of the cap downwardly into the filling neck or opening F of the radiator, with the casing 10 of the cap disposed in position above the radiator in communication therewith through neck 12. The cap is positioned on the radiator R with the port or opening 16 through casing 10 disposed at the forward side in the direction of airflow past the radiator with a vehicle (not shown) on which mounted in forward movement, as will be clear by reference to Fig. 1. Now, if it is desired to more rapidly cool the liquid in the radiator, as for example to prevent overheating thereof, the exterior band or sleeve 18 is manually rotated on casing 10 until the port 19 thereof is in registry, or partial registry, with the casing port 16. In this position of band 18 with a vehicle in forward movement air passes through the opening formed by registered ports 16 and 19, through casing 10 and into the radiator and assists the cooling of the radiator liquid. The area of the opening thus formed can be regulated or adjusted as desired by the extent the ports 16 and 19 are placed in registry. When it is desired to shut off air flow and close the opening to the radiator band 18 is rotated to place ports 16 and 19 in non-registry with the band over and closing casing port 16.

If desired or found expedient the band or sleeve 18, is provided with any suitable screening or the like 20, to prevent entry of foreign matter of an objectionable size into the radiator with the band in position forming a passage or opening through the cap to the radiator. A portion of the screening 20 is shown in Fig. 2 of the drawings by way of example, but the invention contemplates and includes, as the equivalent thereof, the formation of a series of apertures through sleeve or band 18 for registry with or position over the casing opening, in place of the port 19 and the screening 20 thereover, as will be clear and understood by those skilled in the art.

A further feature and function of the invention is that of providing a filler cap for the radiator. The form of the casing 10 with bottom wall 11 and contracted discharge neck 12, provides in effect a funnel, so that by removing the cover 14 of the casing the radiator can be quickly and easily filled with liquid or the liquid replenished without spilling as is usually the case when it is necessary to pour the liquid through the restricted opening formed by the filling neck F of the radiator. In this way the necessity for carrying or employing a funnel for use in filling a radiator is done away with as the radiator cap of the invention provides therefor. If it is not desired to remove cover 14, it is possible to pour liquid into the radiator through the opening formed by the ports 16 and 19 in registry, by the use of a spouted container and in this way avoid removing any element from the radiator, with possibility of loss or misplacement.

It is evident that various changes, modifications, variations, and substitutions might be resorted to without departing from the spirit and scope of my invention, and hence I do not desire to limit myself to the exact and specific disclosures hereof.

Desiring to protect my invention in the broadest manner legally possible, what I claim is:

1. In a radiator cap, a casing formed with a port therethrough, and a sleeve rotatably mounted around said casing over the said port to adjusted positions thereon, said sleeve formed with a port therethrough for adjusted registry with said casing port to form an air passage of desired area, and the said sleeve rotatable to retained position with the port therein in non-registry with said casing port with the sleeve closing the casing port.

2. In a radiator cap, a tubular casing for mounting on and in communication with a radiator, a removable cover for said casing, and a valve sleeve rotatably mounted on and around said casing, said casing formed with a port therethrough, and the sleeve formed with a port therethrough, the sleeve rotatable to place said ports in the desired extent of registry to form an air passage through the cap of the desired area, or to place the sleeve port in non-registry with the casing port to completely close the air passage.

3. In a radiator cap, a tubular casing formed with a reduced lower end forming a discharge neck for mounting in the filling neck of a radiator, a cover for the upper end of said casing, the casing formed with an opening through a side thereof, a sleeve rotatably mounted around said casing for normally closing the casing opening, the said sleeve formed with an opening therethrough for registry with the casing opening by rotation of said sleeve, and the said casing forming a funnel for filling a radiator with the casing cover removed.

4. In combination with a motor vehicle radiator and the filling neck therefor, a tubular casing having a reduced diameter lower discharge end for removably fitting into the radiator filling neck with the casing in communication with the radiator, said casing forming a filling funnel for the radiator, a removable cover for closing the upper enlarged end of the casing, the casing formed with an opening at the forward side thereof separate from the open upper end of the casing for passage of air into the radiator, and means for opening and closing said casing opening to vary the size thereof and control passage of air therethrough.

5. In a radiator cap, a casing formed with a port therethrough, a sleeve rotatably mounted around said casing over the port, said sleeve formed with a port therethrough for registry with said casing port, and screening across the sleeve port, the said sleeve rotatable to position the port therein in non-registry with said casing port with the sleeve closing the casing port, and for rotation to place said ports in varied extents of registry with the screening protecting the passage so formed.

6. In a radiator cap, a casing formed with an opening therethrough, and a member rotatably mounted on and around said casing substantially concentric therewith for closing the port, said member formed with a reticulated portion for varied extents of registry with the casing port to provide for passage and control of air therethrough and into the cap casing.

Signed at Midland, Midland County, Michigan, this 17th day of June, 1926.

FRANK Z. MATHIEU.